United States Patent
Dane et al.

(10) Patent No.: US 7,573,001 B2
(45) Date of Patent: *Aug. 11, 2009

(54) SELF-SEEDED SINGLE-FREQUENCY LASER PEENING METHOD

(75) Inventors: C. Brent Dane, Livermore, CA (US); Lloyd Hackel, Livermore, CA (US); Fritz B. Harris, Rocklin, CA (US)

(73) Assignees: Metal Improvement Company, LLC, Paramus, NJ (US); Lawrence Livermore National Security LLC, Livermore, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/258,807

(22) Filed: Oct. 26, 2005

(65) Prior Publication Data

US 2006/0043079 A1 Mar. 2, 2006

Related U.S. Application Data

(62) Division of application No. 10/696,989, filed on Oct. 30, 2003, now Pat. No. 7,180,918.

(60) Provisional application No. 60/471,490, filed on May 16, 2003.

(51) Int. Cl.
*B23K 26/00* (2006.01)
(52) U.S. Cl. .............................. 219/121.85; 219/121.6
(58) Field of Classification Search ............ 219/121.85, 219/121.6; 372/12, 25
See application file for complete search history.

(56) References Cited

U.S. PATENT DOCUMENTS 3,478,280 A * 11/1969 Fenner ........................ 372/26

(Continued)

FOREIGN PATENT DOCUMENTS

JP S63-043384 A 2/1988

(Continued)

OTHER PUBLICATIONS

Auerbach, J.M., et al., "Diode-pumped monolithic Nd:YLF 1.053•m mini-laser and its application to injection seeding," Solid State Lasers SPIE 1223 (1990) 133-141.

(Continued)

*Primary Examiner*—M. Alexandra Elve
(74) *Attorney, Agent, or Firm*—Haynes Beffel & Wolfeld LLP

(57) ABSTRACT

A method of operating a laser to obtain an output pulse having a single wavelength, comprises inducing an intracavity loss into a laser resonator having an amount that prevents oscillation during a time that energy from the pump source is being stored in the gain medium. Gain is built up in the gain medium with energy from the pump source until formation of a single-frequency relaxation oscillation pulse in the resonator. Upon detection of the onset of the relaxation oscillation pulse, the intracavity loss is reduced, such as by Q-switching, so that the built-up gain stored in the gain medium is output from the resonator in the form of an output pulse at a single frequency. An electronically controllable output coupler is controlled to affect output pulse characteristics. The laser acts a master oscillator in a master oscillator power amplifier configuration. The laser is used for laser peening.

3 Claims, 7 Drawing Sheets

U.S. PATENT DOCUMENTS

| | | | |
|---|---|---|---|
| 3,724,930 A | | 4/1973 | Farmer |
| 3,824,492 A | | 7/1974 | Brienza et al. |
| 4,174,154 A | | 11/1979 | Kawasaki |
| 4,191,928 A | | 3/1980 | Emmett |
| 4,401,477 A | | 8/1983 | Clauer et al. |
| 4,539,462 A | | 9/1985 | Plankenhorn |
| 4,623,229 A | | 11/1986 | Galan |
| 4,698,479 A | | 10/1987 | Rando et al. |
| 4,794,222 A | | 12/1988 | Funayama et al. |
| 4,937,421 A | | 6/1990 | Ortiz, Jr. et al. |
| 5,022,033 A | * | 6/1991 | Hackell ............... 372/25 |
| 5,075,893 A | | 12/1991 | Epstein et al. |
| 5,118,918 A | | 6/1992 | Serrano |
| 5,127,019 A | | 6/1992 | Epstein et al. |
| 5,131,957 A | | 7/1992 | Epstein et al. |
| 5,132,887 A | | 7/1992 | Torii et al. |
| 5,142,118 A | | 8/1992 | Schlatter |
| 5,239,408 A | | 8/1993 | Hackel et al. |
| 5,332,881 A | | 7/1994 | Topkaya et al. |
| 5,449,879 A | | 9/1995 | Lawson et al. |
| 5,525,429 A | | 6/1996 | Mannava et al. |
| 5,569,018 A | | 10/1996 | Mannava et al. |
| 5,571,575 A | | 11/1996 | Takayanagi |
| 5,646,952 A | | 7/1997 | Whittley |
| 5,670,069 A | | 9/1997 | Nakai et al. |
| 5,674,328 A | | 10/1997 | Mannava et al. |
| 5,674,329 A | * | 10/1997 | Mannava et al. ............ 148/525 |
| 5,689,363 A | | 11/1997 | Dane et al. |
| 5,741,559 A | | 4/1998 | Dulaney |
| 5,986,234 A | | 11/1999 | Matthews et al. |
| 5,986,236 A | | 11/1999 | Gainand et al. |
| 6,122,097 A | | 9/2000 | Weston et al. |
| 6,127,649 A | | 10/2000 | Toller et al. |
| 6,188,704 B1 | * | 2/2001 | Kwon et al. ................. 372/25 |
| 6,197,133 B1 | | 3/2001 | Unternahrer et al. |
| 6,198,069 B1 | * | 3/2001 | Hackel et al. ............ 219/121.6 |
| 6,215,097 B1 | | 4/2001 | Mannava |
| 6,259,055 B1 | | 7/2001 | Sokol et al. |
| 6,373,876 B1 | * | 4/2002 | Dulaney et al. ............... 372/98 |
| 6,384,371 B1 | | 5/2002 | Hinei et al. |
| 6,462,301 B1 | | 10/2002 | Scott et al. |
| 6,528,763 B1 | | 3/2003 | Lahram et al. |
| 6,539,035 B1 | | 3/2003 | Yoda et al. |
| 6,657,160 B2 | * | 12/2003 | Hackel et al. .......... 219/121.85 |
| 6,727,458 B2 | * | 4/2004 | Smart .................... 219/121.62 |
| 6,747,241 B2 | | 6/2004 | Shikoda et al. |
| 2002/0096503 A1 | | 7/2002 | Hackel et al. |
| 2003/0217997 A1 | | 11/2003 | Clauer et al. |

FOREIGN PATENT DOCUMENTS

| | | |
|---|---|---|
| JP | H02-260479 A | 10/1990 |
| JP | 7246483 | 9/1995 |
| JP | H11-097782 A | 4/1999 |
| JP | 2000-164958 A | 6/2000 |
| JP | 2002-208749 A | 7/2002 |
| JP | 2002-344051 A | 11/2002 |
| WO | WO 02/29487 A | 4/2002 |

OTHER PUBLICATIONS

Crofts, G.J., et al., "Experimental and theoretical investigation of two-cell stimulated-Brillouin-scattering systems," J. Opt. Soc. Am. B, vol. 8, No. 11, Nov. 1991, 2282-2288.

Dane, C. B., et al., "Design and Operation of a 150 W Near Diffraction-Limited Laser Amplifier with SBS Wavefront Correction," IEEE Journal of Quantum Electronics 31(1) (Jan. 1995), 148-163.

Dane, C.B., et al., "Solid State Laser for X-Ray Lithography," Winter Colloquium on Quantum Electronics, Snowbird, UT (Jan. 6, 1991) 11 pages.

Fairand, B.P., et al., "Laser shock-induced microstructural and mechanical property changes in 7075 aluminum," J. Appl. Phys., vol. 43, No. 9, Sep. 1972, 3893-3895.

Hanna, D.C., et al., "Single longitudinal mode selection of high power actively A-switched lasers," Opto-Electronics 4(1972), 249-256.

Park, Y.K., et al., "Single Axial Mode Operation of a Q-Switched Nd:YAG Oscillator by Injection Seeding," IEEE Journal of Quantum Electronics 20(2) (Feb. 1984), 117-125.

Park, Y.K., et al., "Electronic Linewidth Narrowing Method for Single Axial Mode Operation of Q-Switched Nd:YAG Lasers," Optics Communications 37(6) (Jun. 15, 1981), 411-416.

3M Fluorinert Liquids for Electronics Manufacturing, Product Information, Apr. 1999, 4 pages.

Berry, A. J. et al., "High Power, Single Frequency Operation of a Q-Switched $TEM_{00}$ Mode NdYAG Laser," Optics Communications, Dec. 1, 1981, pp. 54-58, vol. 40, No. 1, North-Holland Publishing Co., Amsterdam, NL..

Dane, C. B. et al., "Design and Operation of a 150 W Near Diffraction-Limited Laser Amplifier with SBS Wavefront Correction," IEEE Journal of Quantoum Electronics, Jan. 1995, pp. 148-163, vol. 31, No. 1, Piscataway, N. J.

Hanna, D. C. et al., "Stable Single-Mode Operation of a Q-Switched Laser by a Simple Resonator Length Control Technique," Optics Communications, Nov. 15, 1982, pp. 414-418, vol. 43, No. 6, North-Holland Publishing Co., Amsterdam, NL.

Park, Y. K. et al., "Electronic Linewidth Narrowing Method for Single Axial Mode Operation of Q-Switched Nd: YAG Lasers," Optics Communications, Jun. 15, 1981, pp. 411-416, vol. 37, No. 6, North-Holland Publishing Co., Amsterdam, NL.

Mac Donald M.P. et al., "Configuration Q-Switching in a Diode-Pumped Multirod Variable-Configuration Resonator," IEEE Journal of Quantum Electronics, vol. 34, No. 2, Feb. 1998, pp. 366-371.

Dane C.B. et al., "High-throughput laser peening of metals using a high-average-power Nd:glass laser system," Proc SPIE Int Soc Opt Eng, Bellingham, WA, USA, vol. 3887, Nov. 1, 1999, pp. 211-221.

EP Search Report, Appl. No. 04252704.4, Mar. 9, 2006.

* cited by examiner

Schematic diagram of the self-seeded single-frequency Q-switched laser with adjustable output coupling

Typical relaxation-oscillation pulse-train near threshold

SELF-SEEDED SINGLE-FREQUENCY LASER PEENING METHOD

RELATED APPLICATION DATA

The present application is a division of U.S. patent application Ser. No. 10/696,989 entitled SELF-SEEDED SINGLE-FREQUENCY SOLID-STATE RING LASER, SYSTEM USING SAME (as amended), filed 30 Oct. 2003, which claims the benefit of U.S. Provisional Application U.S. Provisional Patent Application No. 60/471,490; entitled SELF-SEEDED SINGLE-FREQUENCY SOLID-STATE RING LASER, AND SINGLE-FREQUENCY LASER PEENING METHOD AND SYSTEM USING SAME, filed 16 May 2003 and is incorporated by reference as if fully set forth herein.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to methods using lasers to produce a single-frequency output with a narrow line width, to use of such lasers in master oscillator/power amplifier configurations, and to methods and systems for laser peening based on the same.

2. Description of Related Art

The use of mechanical shocks to form metals and to improve their surface properties has been realized for ages. In current industrial practice, a peening treatment of metal surfaces is accomplished by using high velocity shot. Treatment improves surface properties and very importantly for many applications, results in a part displaying significantly improved resistance to fatigue and corrosion failure. A wide range of components are shot peened in the aerospace and automotive industries. However, for many applications, shot peening does not provide sufficiently intense or deep treatment or cannot be used because of its detrimental effect on the surface finish.

With the invention of the laser, it was rapidly recognized that the intense shocks required for peening could be achieved by means of a laser-driven tamped plasma. B. P. Fairand, et al., "Laser Shot Induced Microstructural and Mechanical Property Changes in 7075 Aluminum," Journal of Applied Physics, Vol. 43, No. 9, p. 3893, September 1972. Typically, a plasma shock of 10 kB to 30 kB is generated at metal surfaces by means of high energy density (about 200 j/cm$^2$), short pulse length (about 30 nanoseconds) lasers. A thin layer of black paint or other absorbing material on the metal surface provides an absorber to prevent ablation of the metal. A confining or tamping material such as water covers the surface layer providing an increased intensity shock. These shocks have been shown to impart compressive stresses, deeper and more intense, than standard shot peening. In testing, this treatment has been shown to be superior for strengthening components from fatigue and corrosion failure. However, lasers with both sufficient energy and sufficient repetition rate to achieve production throughput at affordable costs have been difficult to provide.

One laser system which has been utilized for this purpose is described in our prior U.S. Pat. No. 5,239,408, entitled HIGH POWER, HIGH BEAM QUALITY REGENERATIVE AMPLIFIER. The laser system described in the just cited '408 patent comprises a high power amplifier in a master oscillator/power amplifier MOPA configuration capable of producing output pulses greater than 20 joules per pulse with the pulse width on the order of 30 nanoseconds or less. The '408 patent refers to U.S. Pat. No. 5,022,033, entitled RING LASER HAVING AN OUTPUT AT A SINGLE FREQUENCY, as one implementation of a master oscillator. The oscillator geometry described in U.S. Pat. No. 5,022,033 produces very low energy pulses and therefore requires many more amplifier passes than is achievable with the amplifier system described in U.S. Pat. No. 5,239,408. In some applications, the master oscillator used in the system of the '408 patent was a standing-wave (2 mirror linear resonator) oscillator with an etalon output coupler.

The performance of the MOPA configuration is limited to a degree by the quality of the seed pulse provided by the master oscillator. The master oscillators of the prior art have been able to supply high-quality single-frequency Q-switched oscillator seed pulses. However, it has been difficult to maintain the pulse width and pulse energy substantially constant in a production environment at a sufficient pulse energies.

In general, it is desirable in many applications to have single-frequency Q-switched oscillator pulses from a solid-state laser, both for generating reproducible smooth temporal profiles, without modulation from multiple longitudinal modes, and for achieving the best wavefront reversal fidelity with amplifiers using SBS conjugation. Single longitudinal mode output from a Q-switched laser oscillator has been demonstrated by injection locking a low-power single-frequency master oscillator. Hanna, et al., "Single Longitudinal Mode Selection of High Power Actively Q-Switched Laser," OPTICAL-ELECTRONICS 4, 239-256 (1972). However, this technique requires careful mode matching between the master and slave oscillators and active cavity length stabilization for the Q-switched slave oscillator.

Another method for achieving single frequency output is provided as described in the U.S. Pat. No. 5,022,033, using a self-seeded resonator. A seed pulse was allowed to build up in this prior art approach by maintaining a weak single-frequency, continuous wave (CW) beam in the resonator by managing intracavity loss. An output pulse having beam qualities similar to those of the CW beam is generated by Q-switching because the oscillation which produces the Q-switched pulse builds up from the weak CW beam well ahead of any competing mode. However, the energy per pulse and pulse widths can vary with for example drift in the pump energy, supplied by flashlamps or other pump energy sources, for the ring laser. Thus, the consistency of pulse parameters is relatively poor, and for laser peening operations with output pulses as consistent as possible, it would be necessary to constantly adjust optical parameters of the seed oscillator, such as flashlamp energy and the like. One primary disadvantage of this approach is the long pulse durations (200 ns) and low pulse energies that result from the inefficiencies of keeping a constant, CW seed oscillation running between pulses.

A variation of a self-seeded oscillator is described in Park et al., "Electronic Line WidTh Narrowing Method for Single Axial Mode Operation of Q-Switched Nd:YAG Lasers," OPTICAL COMMUNICATIONS 37, 411-416 (1981).

Thus, it is desirable to provide sequences of pulses, used as seed pulses for a laser peening MOPA for example, with substantially constant energy, substantially constant pulse width, and at a single frequency in sequences of pulses over time intervals that are relevant in a production environment for laser peening and other applications.

SUMMARY OF THE INVENTION

The present invention provides a self-seeded laser oscillator having simple design, and capable of providing as much as 10 times greater energy and 10 times lesser pulse duration than demonstrated using the approach of U.S. Pat. No. 5,022,033. The self-seeded laser oscillator is applied in laser systems having a master oscillator/power amplifier configurations in some embodiments of the invention. In addition, an improved laser peening system and an improved laser peening process are provided based upon sequences of pulses produced according to the present invention that have substantially constant pulse heights and pulse widths without operator intervention over intervals of time that are significant in a production setting.

One embodiment of the invention is a method of operating a laser to obtain an output pulse having a single wavelength. The laser includes a resonator, an output coupler and a gain medium positioned inside the resonator and a pump source. The method comprises inducing an intracavity loss into laser resonator, such as by insertion of a polarization rotation element inside the resonator, rotating polarization slightly off a polarization which is transmitted by an output coupler implemented using a polarization beam splitter. The loss established has an amount that prevents oscillation during a time that energy from the pump source is being stored in the gain medium. Gain is built up in the gain medium with energy from the pump source until a point that the stored gain overcomes the induced loss to produce a seed pulse. The gain overcomes the loss at a point when a ratio of gain to loss is established that results in formation of a single-frequency relaxation oscillation pulse in the resonator.

Upon detection of the relaxation oscillation pulse, the intracavity loss is reduced, such as by Q-switching by electronically controlling the Pockels cell, so that the built-up gain stored in the gain medium is output from the resonator in the form of an output pulse at a single frequency.

The detection of the onset of the relaxation oscillation pulse occurs prior to the peak of the relaxation pulse in some embodiments of the present invention. In other embodiments, the detection of the onset of the relaxation oscillation pulse occurs very early in the pulse, such as at a point occurring at less than 5%, or in other embodiments at a point occurring at less than 1%, of average peak power of such pulses.

The laser oscillator is further optimized by controlling the reflectivity of the resonator output coupler. The choice of reflectivity of the output coupler has a significant impact on the Q-switched pulse duration and output power extraction efficiency. Conventionally, this can only be achieved by optical coatings with differing reflectivities. In the resonator presented here, the output coupler is implemented using a polarizing beam splitter. The effective output coupling of the resonator is dependent on the polarization of the beam in the resonator, established by polarizing elements in the resonator, and in response to pulsed voltage applied to the Pockels cell during the Q-switching. This can be readily optimized by setting polarization components in the resonator, and electronically controlling the pulsed voltage to achieve a desirable Q-switched pulse duration.

Embodiments of the invention also provide a laser system that comprises a laser resonator having an output coupler and a number of other reflectors defining an optical ring, preferably having an odd total number of reflectors including the output coupler. A Q-switch and a gain medium are included in the resonator. A detector is coupled with the resonator to detect oscillation energy in the resonator. A controller is coupled to a source of energy for the gain medium, to the Q-switch, and to the detector. A component in the resonator induces loss while building up gain in the gain medium with the source of pump energy, until a gain to loss ratio is achieved that is sufficient to produce a relaxation oscillation pulse. Upon detection of an onset of the relaxation pulse, the controller decreases the loss using the Q-switching so that an output pulse having a single frequency is generated.

Embodiments of the invention include a set of etalons in the resonator adapted to restrict oscillation to a single longitudinal cavity mode during the onset of the relaxation oscillation pulse. Also, a transverse mode limiting aperture is placed in the laser resonator.

In some embodiments of the invention, the Q-switch comprises a Pockels cell and the output coupler comprises a polarizing beam splitter. A quarter wave plate rotated slightly to induce slightly elliptical polarization at the output coupler induces loss, while allowing a slight amount of light to circulate in the resonator. The controller decreases loss in the resonator by controlling a voltage applied to the Pockels cell. During Q-switching, a voltage pulse is applied to decrease loss in the resonator. By setting the magnitude of the voltage pulse applied during Q-switching, the reflectivity of the output coupler is established at a level chosen to set a desired pulse duration.

In yet other embodiments, the odd number of reflectors in the laser resonator include a flat reflector having an adjustable mount setting angle of reflection. By adjustments of the angle of reflection, adjustments of the length to the optical ring can be made, so that the cavity mode can be matched with the etalon modes.

Embodiments of the laser system produce output pulses having a wavelength of about 1.05 microns. In such embodiments, the gain medium can be neodymium doped solid-state material, including but not limited to Nd:YLF, Nd:glass or Nd:YAG.

In some embodiments, the source of pump energy comprises a flashlamp or and arc lamp. In other embodiments, the pump source comprises a source of optical energy such as a laser diode or laser diode array.

In some embodiments of the invention, the laser system also includes a power amplifier arranged with the laser resonator having in a MOPA configuration, to produce high-power single-frequency pulses with consistent pulse height and pulse width.

According to the present invention, a method for laser shock peening is provided for peening surfaces of plurality of work pieces in an industrial setting. The method comprises producing a sequence of seed pulses having a single wavelength, and substantially constant amplitudes and pulse widths without operator intervention for durations that are significant in the production setting. The seed pulses are supplied to a laser amplifier to induce higher energy output pulses having in the single frequency. The work pieces are positioned in cooperation with a sequence of pulses to peen target regions on the surfaces of the work pieces.

Other embodiments, aspects and advantages of the present invention can be seen on review of the drawings, the detailed description and the claims, which follow.

DETAILED DESCRIPTION

Figure 5:
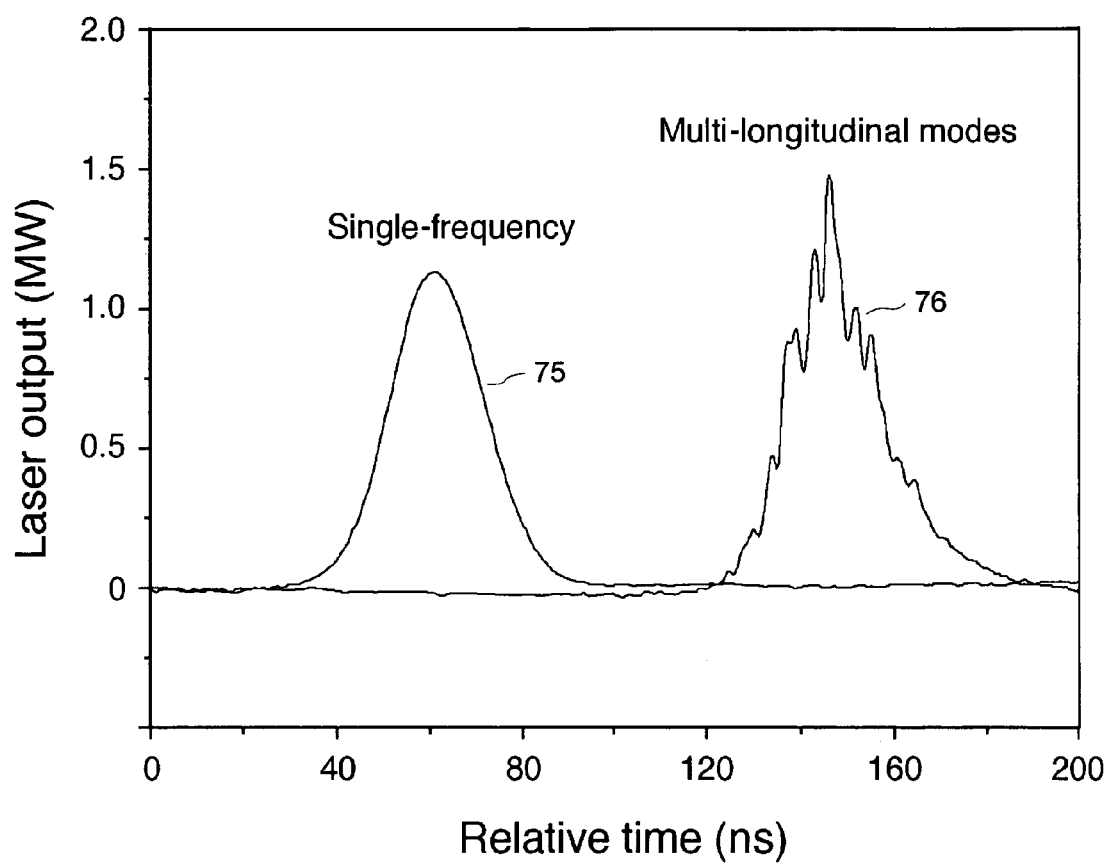
FIG. 5 is a comparison of pulse shape and relative buildup time between single-frequency and multi-frequency Q-switched output pulses
Figure 6:
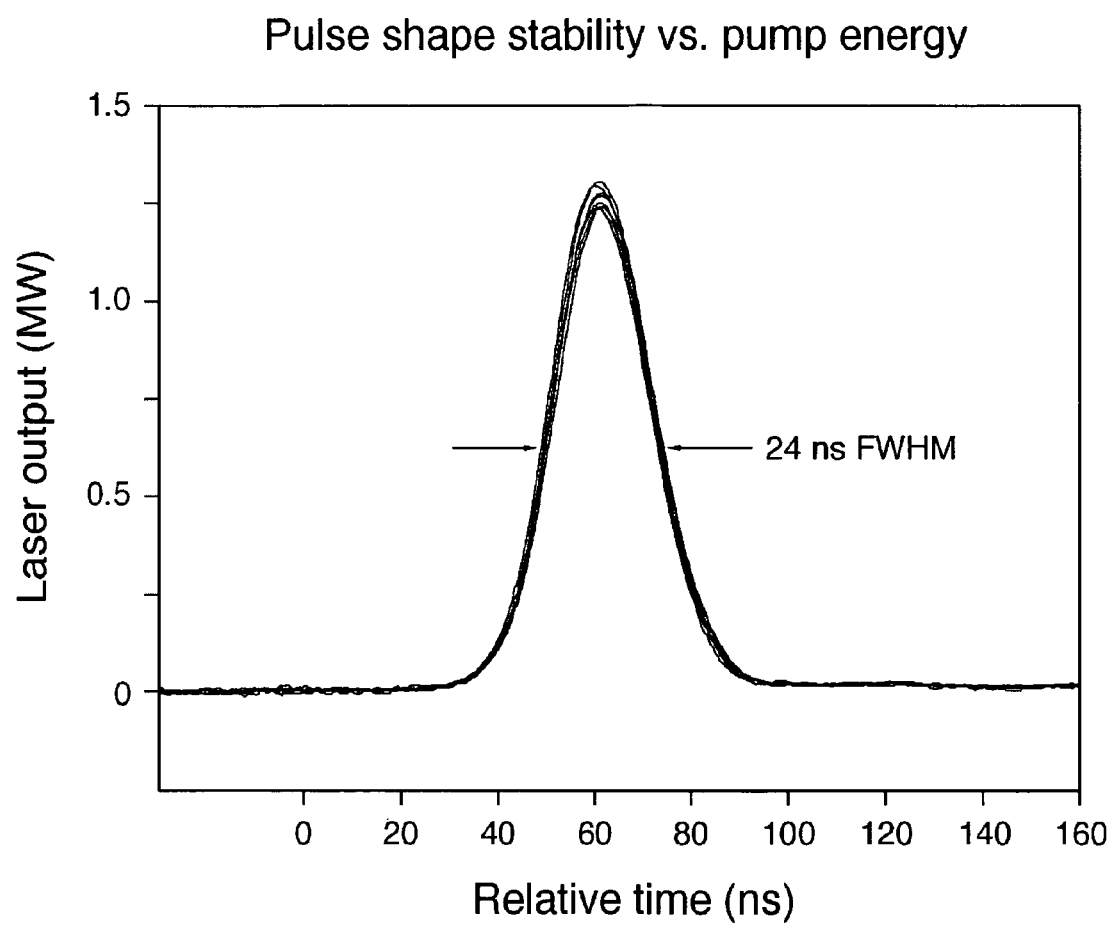
FIG. 6 is a graph overlaying measured temporal profiles of amplified, Q-switched laser pulses illustrating the high degree of stability provided by single-frequency self-seeded operation according to the present invention.
Figure 7:
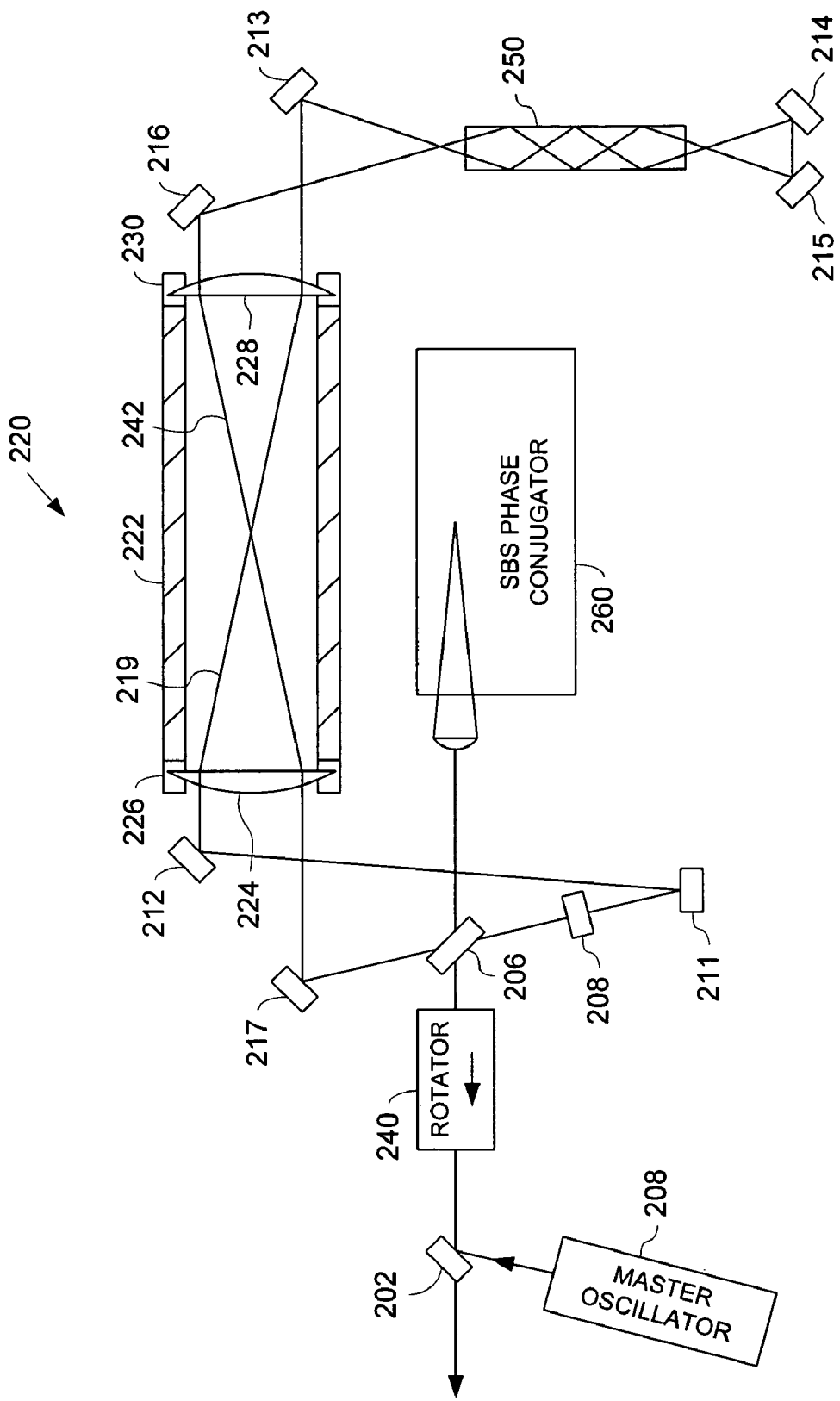
FIG. 7 is an optical schematic of one master oscillator/power amplifier configuration according to the present invention.
Figure 8:
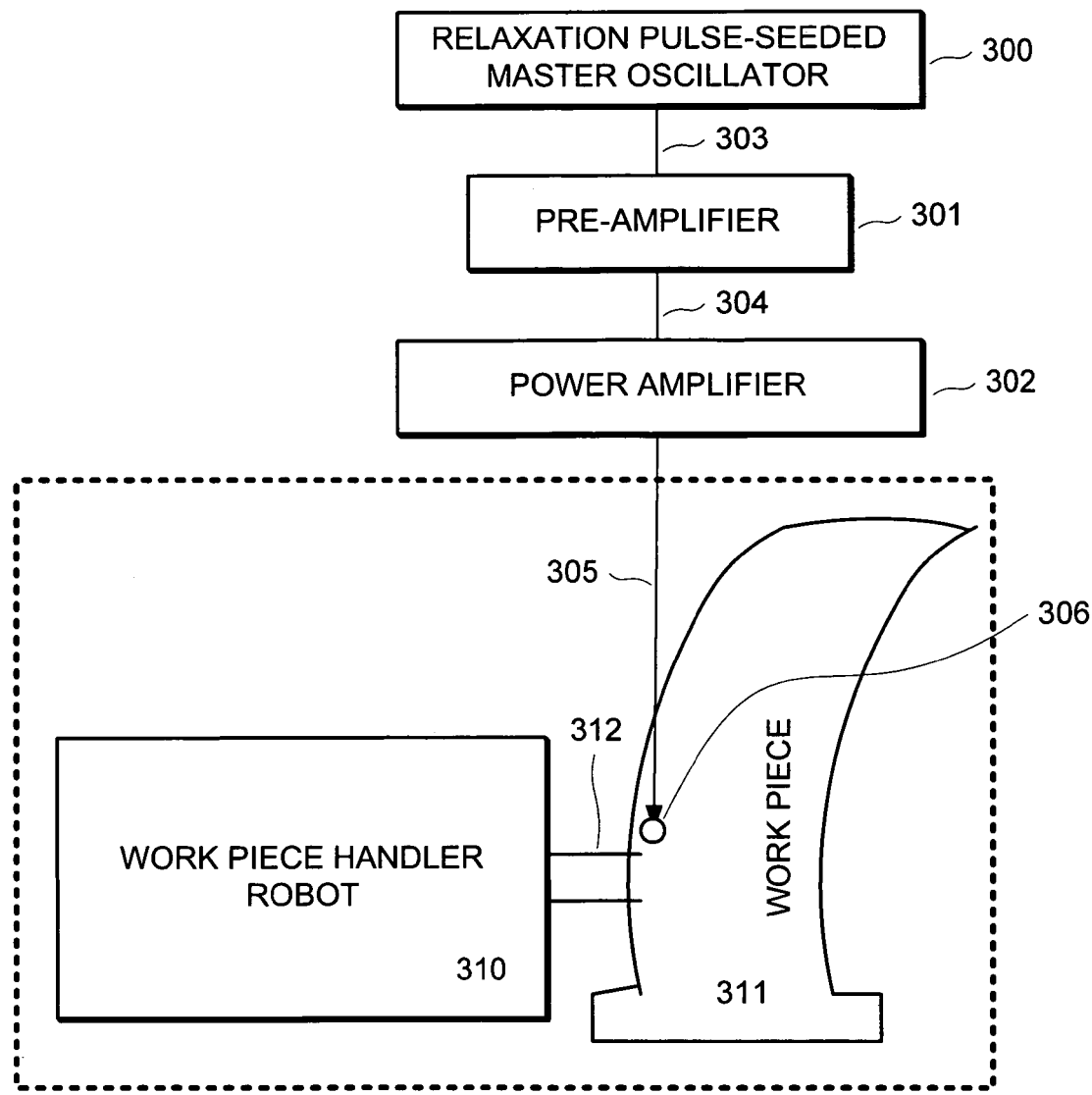
FIG. 8 is a schematic diagram of a laser peening system and method according to the present invention.

A detailed description of embodiments of the present invention is provided with reference to FIGS. 1-8. A self-seeded single-frequency solid-state Q-switched ring laser with electronically adjustable output coupling is described with reference to FIGS. 1-5. FIG. 7 illustrates a master oscillator/power amplifier embodiment of the present invention including the laser system of FIGS. 1-5 as a master oscillator, capable of producing pulses as graphed in FIG. 6. FIG. 8 illustrates application of the present invention in a laser peening environment.

Figure 1:
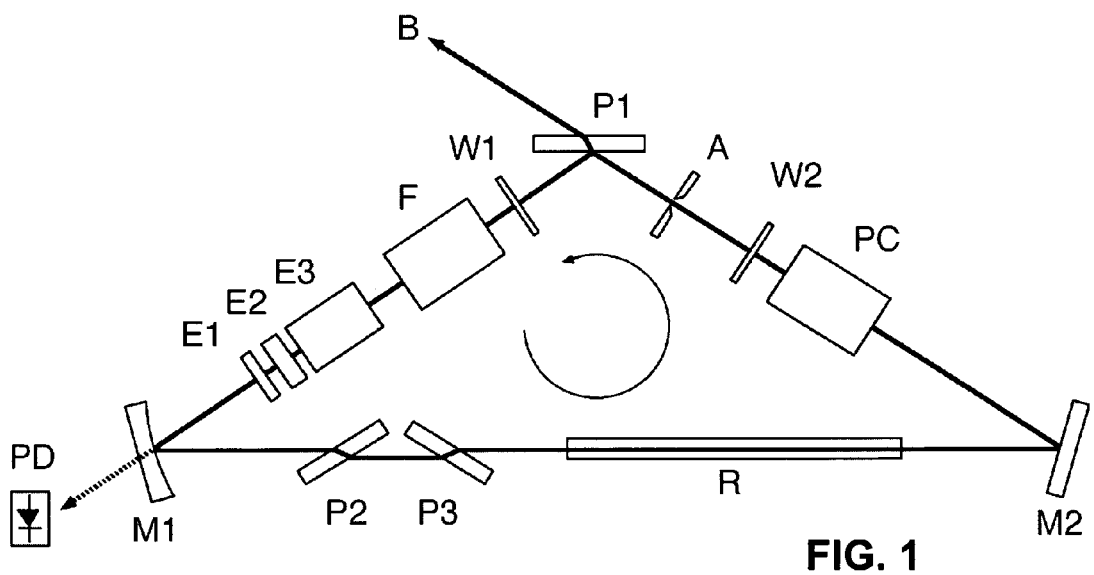
FIG. 1 is an optical schematic of a single-frequency laser resonator according to the present invention.

The basic architecture of the single-frequency Q-switched laser oscillator of an embodiment of the present invention is shown in FIG. 1. Two mirrors M1, M2 and a polarizing beam splitter P1 are arranged to form a resonator in the form of a triangular optical ring. The resonator is housed in a box (not shown) to prevented air turbulence from interfering with operation of the resonator. Going counterclockwise around the ring starting with mirror M1, basic characteristics of the optical components are described.

Mirror M1 comprises a high reflector with a 5 meter radius of curvature with greater than 99% reflectivity at the oscillating wavelength, about 1.05 microns in this embodiment. Polarizing beam splitters P2, P3 comprise fused silica substrates with dielectric coatings on one surface and bare on the other. The beam splitters P2 and P3 are adapted to reflect radiation having the S-polarization, and to transmit radiation having the P-polarization. The polarizing beams splitters are oriented in the beam with an incidence angle of 57 degrees corresponding to the Brewster's angle for fused silica. This prevents reflective losses from the bare surface. A gain medium (solid-state rod R) is placed next in the ring. In this embodiment, the gain medium comprises a Nd:YLF rod 5 mm in diameter and 65 to 100 mm long. Other neodymium doped solid-state media may be utilized, including Nd: glass and Nd:YAG, at wavelengths near 1 micron. Other gain media configurations and types may be used. The gain medium is flash lamp pumped in this embodiment. Other embodiments use other sources of optical energy, such as arc lamps or laser diodes.

Mirror M2 is the next component in the ring. Mirror M2 comprises a flat high reflector, having greater than 99% reflectivity at the wavelengths near 1 micron. The mirror M2 is mounted on adjustable amount in embodiments of the present invention, so that the angle of reflection caused by the mirror can be adjusted. By adjusting the angle of reflection, the cavity length of the ring can be finely tuned to match etalon modes for example, without requiring readjustment of other components in the ring.

A Pockels cell PC is the next component in the ring. The Pockels cell PC comprises KD*P (potassium dihydrogenphosphate using deuterium as the hydrogen components) arranged for electro-optically controlling polarization of the beam passing through the cell. A voltage pulse is applied to the Pockels cell to control resonator loss. In one embodiment, an adjustable pulse having 3000 to 5000 volts may be applied to the Pockels cell having a half wave voltage of about 3800 volts, where circular polarization is generated, causing a 50% reflection from output coupler P1.

A next component in the ring is a quarter wave plate W2 comprising a quartz crystal with an antireflective coating causing an adjustable (90°) polarization rotation to induce loss in the resonator. The quarter wave plate W2 is aligned to cause slightly elliptical polarization in the resonator, so that a small amount of light is allowed to circulate during build up of a relaxation oscillation pulse.

A transverse mode limiting aperture A is placed next, having an aperture of about 1.2 mm.

The polarizing beam splitter P1 acts as a controllable output coupler, through which the output pulses B are supplied.

Half wave plate W1 is the next component in the ring. The half wave plate W1 is a quartz crystal with antireflective coating having a thickness adjusted to cause 45° polarization rotation. Adjacent to half wave plate W1 going counterclockwise is a Faraday rotator, which rotates polarization of the beam by 45° in response to the orientation of the Faraday rotator, rather than beam propagation direction. A permanent magnet Faraday rotator using TGG (terbium gadolinium garnet) can be used in embodiments the present invention.

The final component in the schematic of the ring is a set of etalons E1, E2, E3. The etalons comprise solid, fused silica for Fabry-Perot etalons. Etalon E1 is about 3 mm thick uncoated quartz with about 4% reflectivity. Etalon E2 is about 5 mm thick quartz with reflectivity of about 40%. Etalon E3 is about 30 mm thick with about 40% reflectivity. The etalons E1, E2, E3 are temperature stabilized to prevent drift of the single wavelength.

The resonator has an odd number of mirrors including the output coupler to cancel misalignment in the horizontal direction in the resonator. (Stated alternatively, the resonator includes an output coupler plus an even number of other reflectors defining a ring resonant path.) Thus, changing the angle of the flat reflector M3, that is tilting the reflector M3 as opposed to translating it, allows fine adjustment of the cavity length of the ring resonator. This allows the cavity length to be matched with etalons using a simple adjustment.

FIG. 1 illustrates a photodetector PD adjacent the high reflector M1, used for detecting onset of relaxation oscillation pulses from the radiation leakage through the high reflector M1. A small amount of light leakage from M1 is directed to the photodetector implemented using a fast photodiode.

Polarization can be considered a key to the operation of the laser system of FIG. 1. Based on polarization, the resonator can be divided into two primary functional sections: the optical diode section and the Q-switch section.

The optical diode section is located between polarizing beam splitters P1 and P2. Within this section are located a half wave plate W1, and a 45 degree permanent magnet Faraday rotator F. Wave plate W1 is configured such that it imparts a 45 degree rotation to either S-polarization (electrical field perpendicular to the page was looking at the plan view of the laser) or P-polarization (electrical field parallel to the page). To clarify the following discussion, the polarizing beam splitters P1, P2, P3 shown always reflect S-polarization and transmit P-polarization. Faraday rotator F is oriented so that the 45 degree rotations caused by the Faraday rotator F and the half wave plate W1 cancel in the clockwise propagation direction, and add (giving 90 degree rotation) in the counter-clockwise direction. The effect of this is to provide a very large loss in the optical diode section of the ring for radiation traveling in the clockwise direction. Specifically, a P-polarized beam that transmits through polarizing beam splitter P2 in the clockwise direction receives no rotation by the combination of the Faraday rotator F and the half wave plate W1, leaving it to escape the resonator through the polarizing beam splitter P1. In contrast, an S-polarized beam that reflect from the beam splitter P1 traveling in the counterclockwise direction, receives a 90 degree rotation, converting it from S- to P-polarization, and allowing it to remain in the resonator by transmitting through polarizing beam splitters P2 and P3. The result of the large loss in the clockwise direction and the very low loss in the counterclockwise direction ensures that the light inside the resonator builds up and lases only in the counterclockwise direction, as indicated by the arrow within the ring in FIG. 1, and by the output beam B direction.

The Q-switch section of the resonator is shown in the right half of FIG. 1, and is located between polarizing beam splitters P1 and P3. The purpose of the Q-switch section is to induce strong optical loss in the ring during the time that energy is being stored in the gain medium provided by laser rod R. This prevents the oscillator from lasing until a large amount of gain is present in the rod R. The high gain state is signaled by an onset of a relaxation oscillation pulse, as described below. High gain causes the optical radiation in the resonator to build very quickly, producing a relatively short Q-switched pulse. This oscillator can be very efficiently operated with pulse durations between 50 and 20 nanoseconds, or less, full width half maximum. In effect, controlling the Pockels cell in the Q-switch section allows setting a lossy mode, during which oscillation is prevented while gain builds up on the gain medium until generation of a relaxation oscillation pulse, and a mode with reduced loss, during which an output pulse is generated.

Another function of the Q-switch section of the resonator, is to set the optical output coupling of the resonator. When no voltage is applied to the electro-optic Pockels cell PC, the polarization of the beam propagating through the cell is unchanged. That means that light which is transmitted through the polarizing beam splitters P2 and P3 in P-polarization does not reflect from the polarizing beam splitter P1, and is completely lost (except for a small amount of S-polarization induced by wave plate W2) by transmitting through the beam splitter P1. The output coupler of this resonator is actually the polarizing beam splitter P1. Until a voltage is applied to the Pockels cell, the output coupler has near zero reflectivity so that oscillation within the laser resonator is only possible when high gain is stored in the gain medium. However, when appropriate voltage is applied to the Pockels cell, the polarization of the P-polarized beam that reflects from the mirror M2 is partially rotated, causing some fraction of the beam to reflect from P1. In this way, there is a straightforward electronic adjustment of the resonator output coupling without changing optical components or coatings, and without any optical realignment of the resonator. For example, applying the half wave voltage to the Pockels cell will cause near 50% of the light to be reflected from P1. Applying a full wave voltage to the Pockels cell will cause near 100% of the light to be reflected.

In operation, the gain in the amplifier rod R is allowed to reach a desired level and then voltage is applied to the Pockels cell, increasing the reflectivity of P1. The voltage level applied is determined empirically to establish a pulse duration, as suits a particular installation of the laser system. At this point, radiation quickly builds up inside the optical cavity defined by the resonator, extracting energy from the rod R, and emerging through P1 as an output pulse B.

The laser oscillator in FIG. 1 is designed to provide an output beam at a single optical frequency. This means that oscillation needs to be restricted to a single longitudinal cavity mode. To do this a set of etalons, comprising at least two etalons E1 and E2, and more preferably three etalons E1, E2 and E3, are inserted into the resonator as shown in FIG. 1. Each etalon has high optical transmission at evenly spaced frequencies. The spacing is determined by the length of each etalon using the formula $c/2nL$, where c is the speed of light, n is the index of refraction of the etalon material, and L is the length of the etalon. The laser resonator also has low-loss longitudinal frequency modes, equally spaced by a frequency of $c/L$, where L in this case is the round trip optical distance through the resonator. Three etalons of increasing length are used to so the net effect of their periodic transmission characteristics results in a single resonator mode, within the frequency bandwidth of the gain in the laser rod that has lower optical loss than all others. The laser radiation inside the resonator builds up at the frequency of this cavity mode and the resulting output beam has a single frequency. Lengths and coatings chosen for the etalons determine the desired frequency selection according to well-known principles of the art.

The efficiency of the frequency selectivity in the resonator is only completely effective when the radiation builds up in the laser resonator relatively slowly. If the Q-switched pulse is allowed to grow very quickly, then it requires a relatively few (less than 10) round trips through the resonator. Because the radiation interacts for a short time with the intracavity etalons, the loss caused by the etalons at undesirable frequencies might be insufficient to suppress additional cavity modes in the laser output. For this reason a self-seeded approach is taken to the operation of the Q-switched laser oscillator.

Figure 2:
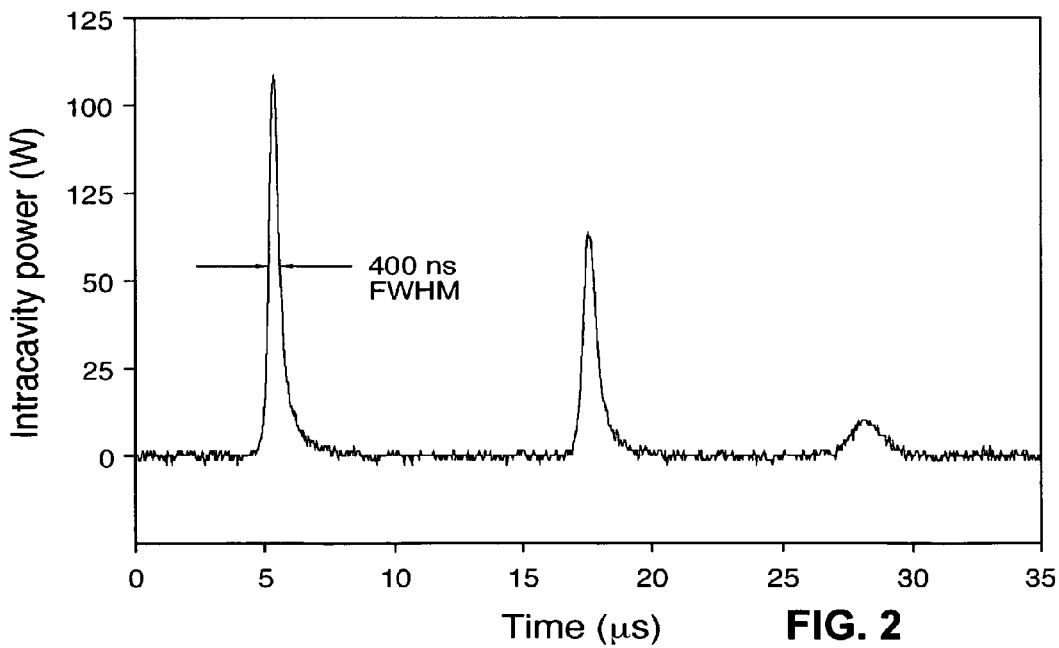
FIG. 2 is a graph showing single-frequency relaxation oscillation pulses used to seed Q-switched pulse buildup in the system of FIG. 1.

During the time that energy is being stored in the laser amplifier rod R, oscillation would normally not be allowed to take place until it was time to extract a short Q-switched pulse. However, in this laser, the additional quarter wave plate W2 is inserted into the Q-switch section of the laser. When the optical axis of wave plate W2 is perfectly aligned with the P-polarization of the beam, no P-polarization rotation occurs. However if W2 is rotated by a small amount, the intracavity beam becomes elliptically polarized, allowing some fraction of the beam to reflect from polarizing beam splitter P1. In an alternative approach, rather than rotating the wave plate W2, a small voltage can be applied to the Pockels cells to induce the required elliptical polarization during build up of gain. In effect, the elliptical polarization give the output coupler P1 a small reflectivity during the pumping process, which allows the laser to just reach threshold near a peak in amplifier gain. When W2 is optimally adjusted, the output from the laser consists of the few (1-3) relaxation oscillation pulses as shown in FIG. 2. These pulses are typically quite long in duration (400 nanoseconds full-width half-maximum). The build up to one of these weak relaxation oscillation pulses takes many microseconds, resulting in many hundreds of passes through the intracavity etalons. The multiplication of the optical losses from the many etalon passes provides very strong suppression of all the laser cavity modes except one. Now that this low-power, single-frequency light is present in the resonator, voltage can then be applied to the Pockels cell, generating a short, high-power Q-switched pulse. Since the high-power pulse (about one megawatt) builds up from the low-power relaxation oscillation (about 100 W), it has the frequency characteristics of the relaxation oscillation seed.

Figure 3:
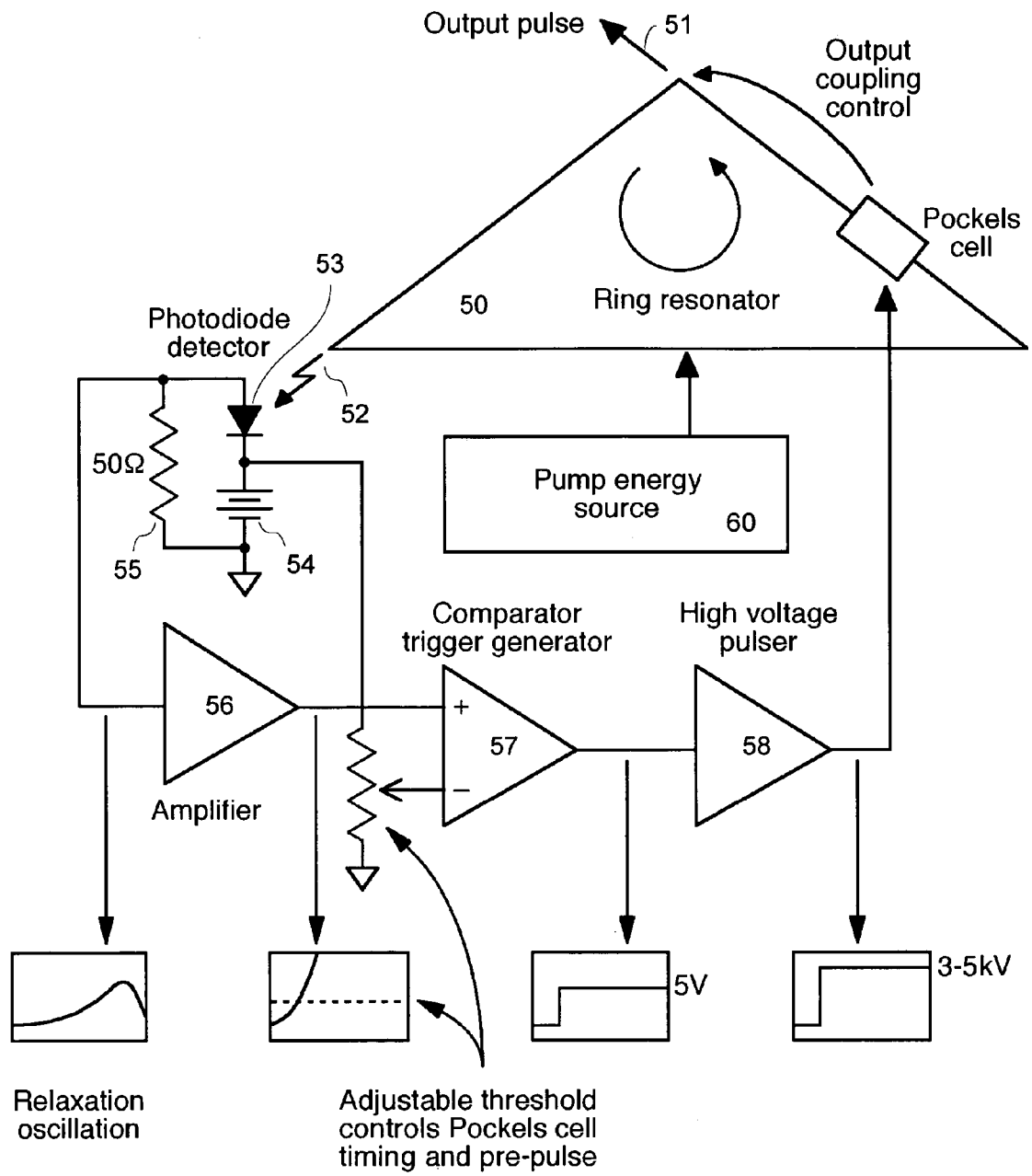
FIG. 3 is a simplified schematic of the control circuitry for the laser system of FIG. 1.

In practice, the self-seeding process is optimized by applying the voltage to the Pockels cell (Q-switching) once the presence of the weak relaxation oscillation pulse has been detected using the external photodiode PD shown in FIG. 1. FIG. 3 provides a schematic for the control system for the laser system. The ring resonator is represented by triangle 50 and generates output pulse on line 51. Energy leaks on line 52 from the high reflector M1, and is detected by photodiode 53. The photodiode is back biased by a battery 54 and resistor 55 to react quickly to the detection of the onset of the relaxation oscillation pulse. The output of the photodiode is amplified in pulse amplifier 56 and applied to a trigger generator 57 (e.g. Stanford Research Model DG 535). The trigger generator trigger is coupled to a Q-switch pulser 58 implemented using a Marx bank power supply. In one example system, the Q-switch is provide by Continuum Model LM81M-995, which includes a Q-switch power supply, a Marx bank, a step up voltage supply, and the Q-switch.

A pump energy source 60 is coupled to the gain medium inside the ring resonator 50. The Q-switch pulser 58 applies a pulse to the Pockels cell inside the ring resonator 50. The photodiode 53 operates with a fast response by means of a back biasing battery 54 that puts in the photo-conductive mode. By setting the gain of the pulse amplifier 56 or the trigger level of the trigger generator 57, an output of sufficient voltage is provided just as the oscillator begins to lase at a single frequency. This output provides a trigger signal that is fed to the Q-switch pulser 58 to command it to open and allow the oscillator to operate at full energy and single frequency. The timing of the Q-switch pulse is set to occur upon detection of the onset of the relaxation pulse, before the peak of the pulse, and preferably upon detection of less than 5% of the average peak amplitude detected by the photodiode. The Q-switch pulser 58 is adjustable so that the magnitude of the voltage pulse applied to the Pockels cell can be varied to adjust the reflectivity of output coupler, and thereby the output pulse width. Thus, an electronic controller is provided to set conditions inducing loss in the resonator (e.g., no voltage or low voltage on Pockels cell) at a level allowing build up of gain in the gain medium to produce a relaxation oscillation pulse, and conditions decreasing loss in the resonator (e.g., adjustable voltage on Pockels cell) using the Q-switch in response to detection of the relaxation oscillation pulse, so that an output pulse having a single frequency is generated.

Figure 4:
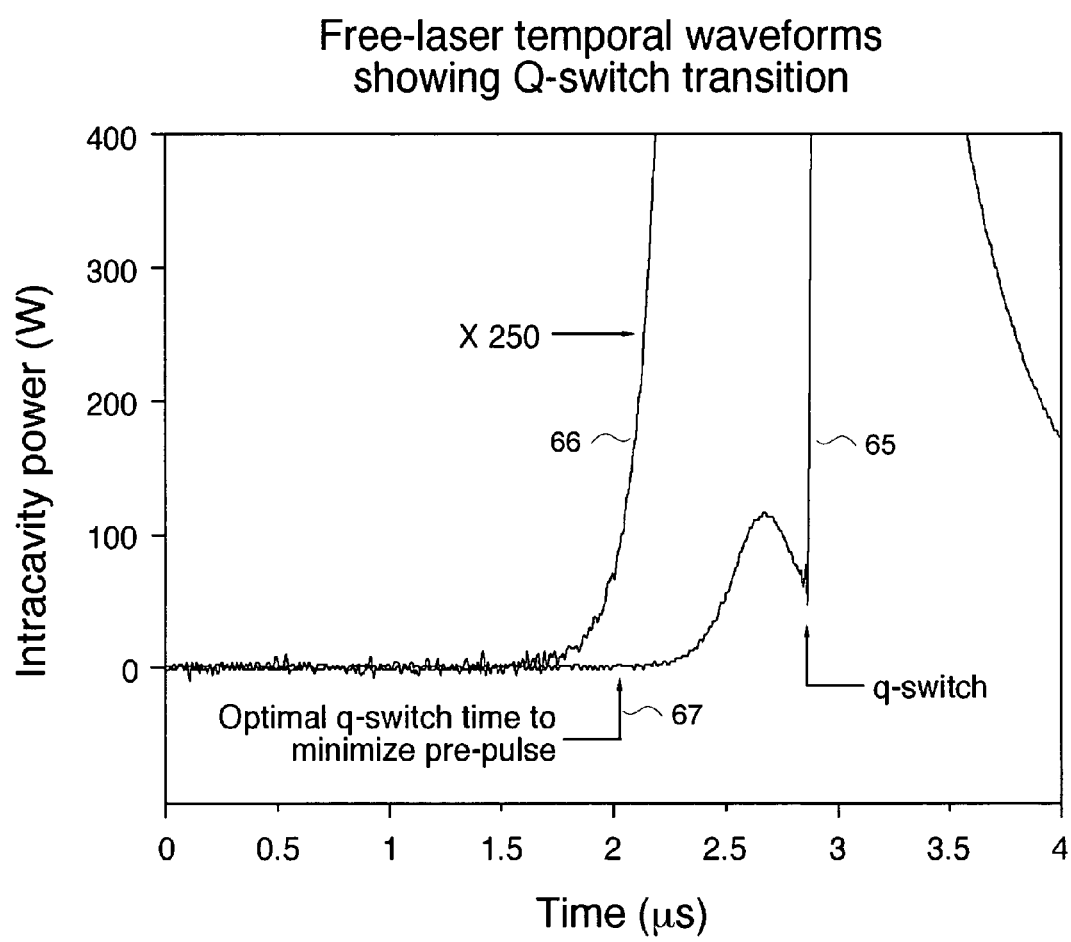
FIG. 4 is a graph illustrating the detection of the onset of a relaxation oscillating pulse for the system of FIG. 1.

FIG. 4 shows the relaxation oscillation before and after Q-switching on trace 65. On trace 66, the amplitude scale of the relaxation pulse is amplified by 250 to illustrate the detection of onset of the relaxation pulse. On trace 65, the Pockels cell was triggered after the peak of the relaxation oscillation for the purpose of clearly illustrating the process. It is generally advantageous to trigger the Pockels cell much earlier, to minimize the size of the self-seeded foot on the Q-switched temporal pulse profile. Thus, the onset of the relaxation oscillation pulse detected when the output of the photodiode reaches a level indicating less than about 5%, and more preferably less than about 1% such as at point 67 on the graph of FIG. 4, of average peak power of the relaxation oscillation pulse prior to the peak.

FIG. 5 compares two Q-switched pulses, including a self-seeded, single-frequency pulse 75, and a multimode pulse 76. The single-frequency pulse 75 generated using the technique of the present invention has a smooth temporal profile and shorter buildup time than is seen in the multimode pulse.

In preferred systems, it is important that the relative alignment between frequency transmission peaks is consistently maintained for the intracavity etalons. This is accomplished by housing them in a metal cylindrical enclosure. Water with a very stabilized temperature is allowed to flow through hollow passages in the cylindrical enclosure to maintain the etalons at a very precise temperature and therefore very constant optical lengths.

In addition, the intracavity etalons E1, E2, E3 are located inside the optical diode section of the resonator in preferred systems. The etalons do their job by providing optical loss at frequencies other than the desired laser frequency. They provide this loss by reflecting the unwanted frequencies. Since the etalons have their highest frequency discrimination when their surfaces are aligned very near 90° (normal incidence) to the beam path, these undesirable reflections must be prevented from coupling back into the resonator. For this reason, the etalons are located inside the optical diode section of the resonator. Reflections that may occur from the surfaces of the etalons propagate in the clockwise direction back through the Faraday rotator F and wave plate W1, converting them from S- to P-polarization. This allows them to transmit through polarization beam splitter P1 (the output coupler) and be lost, preventing them from growing in power due to amplification in the laser resonator.

By triggering the Pockels cell in response to detection of the onset of a weak relaxation oscillation pulse in the laser resonator, an important consequence results. Laser oscillation and light buildup can only began once sufficient energy has been stored in the laser amplifier rod such that the optical gain to optical loss ratio in the resonator is greater than one. This means that the Pockels cell voltage will be applied, and the Q-switched output pulse will be generated, at the substantially the same gain to loss ratio, independent of how hard the amplifier rod is pumped. For this reason, even if there are fluctuations in the pulse-to-pulse pump energy to the rod, the Q-switched pulse energies remain very stable. In fact, if the user increases the energy to the pump source, the Q-switched pulse energy does not change. The threshold optical gain in the rod simply reaches the lasing threshold more quickly and the Q-switched pulse is generated earlier in time.

In sum, a solid-state Q-switched ring laser generates pulse durations in the range of 20 to 50 nanoseconds. Reliable single-frequency operation is achieved by a self-seeding technique in which oscillation is allowed to build up very slowly (one or two microseconds). When the intracavity circulating optical power reaches a preset threshold, as detected by an external photodiode, and intracavity Pockels cell is used to Q-switch the optical buildup, resulting in single-frequency output pulses with very high shot to shot energy stability. The effective output coupling (i.e. the reflectivity of the output coupler) can be easily adjusted in real time by electronically varying the voltage waveform applied to the Pockels cell. This design demonstrates reliable and stable performance in continuous operation, 24 hours a day.

FIG. 7 is a schematic diagram of the master oscillator/power amplifier configuration with a regenerative laser amplifier suitable for use with a master oscillator 200 implemented as described above. More details of an embodiment of the amplifier is provided in U.S. Pat. No. 5,239,408, which is incorporated by reference as if fully set forth herein. The amplifier system of FIG. 7, includes a rotator 240, such as a Pockels cell or Faraday rotator, a relay telescope 220, a slab-shaped gain medium 250, and an SBS phase conjugator 260. The slab 250 is enclosed in a pump cavity (not shown). Two polarizers 202 and 206 are also included for capturing an input pulse, and extracting an output pulse. Seven flat, highly reflecting mirrors 211, 212, 213, 214, 215, 216, and 217, define an optical path through the slab 250, and telescope 220, and polarizer 206 connects the ring to SBS phase conjugator 260.

In operation, a master oscillator 200 supplies an input pulse which has S polarization. The pulse reflects off polarizer 202, proceeds through an isolation Pockels cell 240 remaining unchanged in polarization, and is further reflected off polarizer 206 into a ring shaped optical path defined by mirrors 211-217.

In the ring, the beam enters the 90 degree rotator 208 which rotates the beam by 90° to the P polarization. The pulse proceeds through mirrors 211 and 212 along optical path 219 through relay telescope 220.

The telescope 220 includes a vacuum chamber 222 having a first lens 224 mounted by a vacuum tight seal 226, and a second lense 228 mounted by vacuum tight seal 230. In an illustrative embodiment, each of the lenses 224 and 228 is a 1.2 meter focal length lense. The spacing between lenses 224 and 228 is approximately 2.4 meters adjusted so that the lense pair is afocal.

From telescope 220, the beam proceeds through mirror 213 into and through the slab 250 where it is reflected by mirrors 214 and 215 back through the slab 250. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

From slab 250, the beam is reflected off mirror 216 along path 242 through telescope 220, off mirror 217 where it is reflected back into polarizer 206. Since the beam has been rotated by the 90 degree rotator 206 from the S polarization to the P polarization, the P polarized beam is transmitted by polarizer 206 to 90 degree rotator 208 to proceed through the ring a second time. However, during this second pass through the ring, 90 degree rotator rotates the polarization by 90° back to the S polarization. Therefore, when the beam reaches the polarizer 206 at the end of a second pass through the ring, it will be reflected into SBS phase conjugator 260.

The beam proceeding back out of the SBS phase conjugator, still having the S polarization, but reversed phase error will be reflected by polarizer 206 to mirror 217 where it will proceed along path 242 through telescope 220 to mirror 216. From mirror 216. From mirror 216, the beam will proceed through slab 250 a first time and be reflected back through the slab 250 a second time by mirrors 214 and 215. Proceeding out of slab 250, the beam will be reflected off mirror 213 and proceed back through telescope 220 and mirrors 212 and 211 to 90 degree rotator 208. The 90 degree rotator 208 will rotate the polarization by 90° back to the P polarization and transmit the beam to polarizer 206, thus completing a third pass through the ring, but this time in the reverse direction from the first two passes.

Since the beam has a P polarization, the beam will pass through polarizer 206 and proceed through the ring for a fourth pass through the ring, or a second pass in the reverse direction. At the end of this fourth pass through the ring, 90 degree rotator will rotate the polarization back to the S polarization causing the beam to reflect off of polarizer 206 out of the ring and into isolation Pockels cell 240. By this point, the net accumulated phase error is essentially zero. Isolation Pockels cell 240 or Faraday rotator will rotate the polarization of the beam to the P polarization enabling the beam to pass through polarizer 202 as a high energy output pulse.

Thus, the amplifier illustrated in FIG. 7 exhibits reduced diffraction, minimizing the likelihood of high peak perturbations in a beam, by utilizing two paths around the ring before entering the phase conjugator, and two equal and opposite paths around a ring after exiting the phase conjugator. The ring, further, utilizes a passive phase shifter instead of a Pockels cell. Additionally, all optical components are placed near the image planes by the use of two relay telescopes. The amplifier also exhibits higher gain to loss, with two slab passes per ring transit.

The single-frequency master oscillator 200 in FIG. 7 provides consistent single-frequency with good amplitude and temporal stability, and is implemented as described above with reference to FIGS. 1-5. FIG. 6 illustrates a number of superimposed Q-switched temporal pulse profiles generated using a laser system of FIG. 7. The representative pulse profiles have pulse height of greater than 1.2 megawatts and a pulse width of about 24 nanoseconds full width half maximum. The pulse width and pulse heights are remarkably constant. The laser has the ability to reproduce substantially constant pulse widths and pulse heights during production operation for hours, days, weeks and months, without operator intervention.

The relaxation pulse seeded oscillator of the present invention is suitable for high pulse energy solid-state master oscillator/power amplifier laser systems that employ SBS conjugation as described above. It can also be used in systems incorporating nonlinear frequency conversion, such as frequency doubled and tripled lasers, Raman frequency conversion, and as a pump source for optical parametric oscillators and optical parametric amplifiers. The oscillator design is particularly well-suited to stressful environments, such as production mode facilities for industrial manufacturing, where high stability outputs are obtained in the presence of energy source variations, temperature variations and mechanical vibrations. Representative commercial applications include laser peening, laser peen forming, laser peen marking, laser machining and laser annealing.

FIG. 8 is a simplified diagram of a production system for laser peening surfaces of work pieces using the present invention. The production system includes a relaxation pulse seeded master oscillator 300 implemented as described above with respect to FIGS. 1-5. A preamplifier 301 amplifies the sequence of pulses on line 303 from the master oscillator 300. The output of the preamplifier 304 is applied to a power amplifier 302, such as the power amplifier described with reference to FIG. 7. High power pulses are applied on line 305.

A workpiece handler robot 310 secures the workpiece 311 with securing arms 312. The workpiece 311 may be a turbine blade from a jet engine, or other metallic component having a target region on a surface for laser peening. In operation, a high power pulse impacts the workpiece 311 at spot 306, the robot 310 moves the workpiece, and the next pulse is applied. The pulse rate of the laser system. 300-302 is greater than 1 hertz, for example about 3 hertz in one embodiment. The robot 310 moves the workpiece 311 in cooperation with the sequence of pulses to peen the target region on the surface of the workpiece 311.

It is found that the stability of the seed pulses provided by the relaxation seeded oscillator 300 translates to the output of the amplifier 302 extremely well. Thus, the pulse width and pulse height of the seed laser are substantially constant during production operation. It is found that the root mean square energy stability varies less than 1% over a period of time required to laser peen a plurality of work pieces in a substantially continuous production environment, as work pieces are mounted on the robot 310, the target regions are peened, the workpiece is removed, and new work pieces are mounted. For example, for a power amplifier producing about 15 to 20 joules per pulse, it is found that the pulse height varies less than 150 millijoules over a sequence of over one million pulses in a production environment. In response to substantially constant seed pulses, a sequence of higher power output pulses can be provided by the power amplifier having a substantially constant energy per pulse in a range from about 10 to about 100 joules per pulse and a substantially constant pulse width in a range from about 20 to 30 nanoseconds over a significant interval in a production environment, and in some cases as much at least one sequential million pulses. In a significant interval, a commercial run of work pieces is laser peened using the present invention meeting rigorous standards for consistency and reliability for the work pieces processed during the run. In some commercial runs, a significant interval is at least three days, and can be weeks or months. In other commercial runs, a significant interval for production operation is long enough to peen a plurality of work pieces related as a set of work pieces requiring rigorous standards of consistency and reliability during the run.

In fact, substantially constant pulse heights and pulse widths can be expected using the system of the present invention for weeks or months of production operation without operator intervention to adjust the master oscillator.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for laser shock peeling surfaces of work pieces, comprising:
   producing a sequence of seed pulses having a single wavelength using a laser oscillator, the laser oscillator including a resonator, an adjustable output coupler also functioning as a cavity mirror, a gain medium positioned inside the resonator and a pump source; including producing the seed pulses in the sequence by
      inducing an intracavity loss into the resonator, the loss being an amount that prevents oscillation during a time that energy from the pump source is being stored in the gain medium;
      building up gain with energy from the pump source in the gain medium with the adjustable output coupler set to a relatively low reflectivity until formation of a single-frequency relaxation oscillation pulse in the resonator; and
      reducing the intracavity loss induced in the resonator by increasing the reflectivity of the adjustable output coupler upon the detection of the relaxation pulse so that built-up gain stored in the gain medium is output from the resonator in the form of a seed pulse in the sequence;
   supplying the sequence of seed pulses to a laser amplifier to induce a sequence of higher energy output pulses having said single frequency; and
   positioning said work pieces in cooperation with said output pulses to peen target regions on said surfaces.

2. The method of claim 1, wherein the adjustable output coupler comprises a polarizing beam splitter; and including adjusting the reflectivity of the output coupler by controlling polarization of the beam within the resonator.

3. The method of claim 2, including controlling polarization within the resonator using a Q-switch.

* * * * *

UNITED STATES PATENT AND TRADEMARK OFFICE
CERTIFICATE OF CORRECTION

| | | |
|---|---|---|
| PATENT NO. | : 7,573,001 B2 | Page 1 of 1 |
| APPLICATION NO. | : 11/258807 | |
| DATED | : August 11, 2009 | |
| INVENTOR(S) | : C. Brent Dane et al. | |

It is certified that error appears in the above-identified patent and that said Letters Patent is hereby corrected as shown below:

Column 13, line 30, delete the word "peeling" and insert -- peening --.

Signed and Sealed this

Twenty-second Day of September, 2009

David J. Kappos
*Director of the United States Patent and Trademark Office*